United States Patent
Messick et al.

(10) Patent No.: US 12,093,724 B2
(45) Date of Patent: Sep. 17, 2024

(54) SYSTEMS AND METHODS FOR ASYNCHRONOUS JOB SCHEDULING AMONG A PLURALITY OF MANAGED INFORMATION HANDLING SYSTEMS

(71) Applicant: Dell Products L.P., Round Rock, TX (US)

(72) Inventors: Doug E. Messick, Austin, TX (US); Kyle E. Cross, Austin, TX (US); Wei G. Liu, Austin, TX (US); Arun Muthaiyan, Round Rock, TX (US); Prashanth Giri, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 441 days.

(21) Appl. No.: 16/910,532

(22) Filed: Jun. 24, 2020

(65) Prior Publication Data

US 2021/0406064 A1    Dec. 30, 2021

(51) Int. Cl.
*G06F 9/48* (2006.01)
*G06F 9/46* (2006.01)

(52) U.S. Cl.
CPC .......... *G06F 9/4881* (2013.01); *G06F 9/466* (2013.01)

(58) Field of Classification Search
CPC .............................. G06F 9/4881; G06F 9/466
See application file for complete search history.

(56) References Cited

U.S. PATENT DOCUMENTS

2021/0365023 A1* 11/2021 Yunoki ................ G05B 19/056

* cited by examiner

*Primary Examiner* — Wissam Rashid
(74) *Attorney, Agent, or Firm* — Jackson Walker L.L.P.

(57) ABSTRACT

Disclosed methods for managing two or more information handling systems receive administrator preferences for a job to be scheduled ton each system and assign time slots, based on the administrator preferences, for performing the job on each system. The time slots are assigned in a manner that avoids or minimizes time slot overlap. Job requests are created for each system wherein each job request includes or otherwise indicates a scheduled time slot for executing the job.

20 Claims, 2 Drawing Sheets

SYSTEMS AND METHODS FOR ASYNCHRONOUS JOB SCHEDULING AMONG A PLURALITY OF MANAGED INFORMATION HANDLING SYSTEMS

TECHNICAL FIELD

The present disclosure relates in general to information handling systems, and more particularly to methods and systems for asynchronous job scheduling among a plurality of managed information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some data center servers are equipped with chassis manager firmware, which manages individual information handling system server nodes within a chassis. Similarly, some data center servers are equipped with group managers that may manage multiple information handling system server nodes within a data center or enterprise.

Modern servers include many features and firmware update mechanisms that may require a system to power cycle or otherwise enter a state of reduced management control. Three distinct examples include a BIOS update that requires a reboot of a host information handling system, a baseboard management controller update that requires a reboot of the baseboard management controller, and a root of trust feature that requires a manageability engine (e.g., Intel Manageability Engine) to be in a recovery mode where normal power controls are not active. In each of these scenarios, a server may be subject to non-ideal states such as server down time if the host is rebooted, limited performance due to failsafe power limits, and faster air mover speeds that may increase power and noise.

On an individual server basis, these non-ideal states cause little to no customer impact due to optimized server behavior, application redundancy, and datacenter power and cooling margin. However, problems may arise if a large group of servers in a datacenter experience non-ideal states all at the same time. There are existing features or scripts that allow a customer to schedule when features or firmware updates are deployed. However, there is not an intuitive and robust method for customers to deploy features or firmware updates in an asynchronous fashion that minimizes or eliminates the risk that an entire set of managed or unmanaged devices will concurrently experience non-ideal states.

SUMMARY

In accordance with the teachings of the present disclosure, the disadvantages and problems associated with existing approaches to managing job scheduling among a plurality of information handling systems may be reduced or eliminated.

In accordance with embodiments of the present disclosure, a method may include, at a management module configured to manage a plurality of information handling systems: receiving administrator preferences for a job to be scheduled at each of the plurality of information handling systems, based on the administrator preferences, assigning for each of the plurality of information handling systems a respective time slot for performing the job at such information handling system, in order to avoid or minimize overlap among the respective time slots, and creating for each of the plurality of information handling systems a respective job request for performing the job at such information handling system, the job request including a scheduled time for execution of the job based on the respective time slot of such information handling system.

In accordance with these and other embodiments of the present disclosure, a method may include, at an information handling system, receiving a job request associated with the information handling system including a scheduled time for execution of a job of the job request, and determining a node-based delay for job execution based on an attribute of the information handling system.

In accordance with embodiments of the present disclosure, an article of manufacture may include a non-transitory computer-readable medium and computer-executable instructions carried on the computer-readable medium, the instructions readable by a processor, the instructions, when read and executed, for causing the processor to, at an information handling system: receive a job request associated with the information handling system including a scheduled time for execution of a job of the job request, and determine a node-based delay for job execution based on an attribute of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
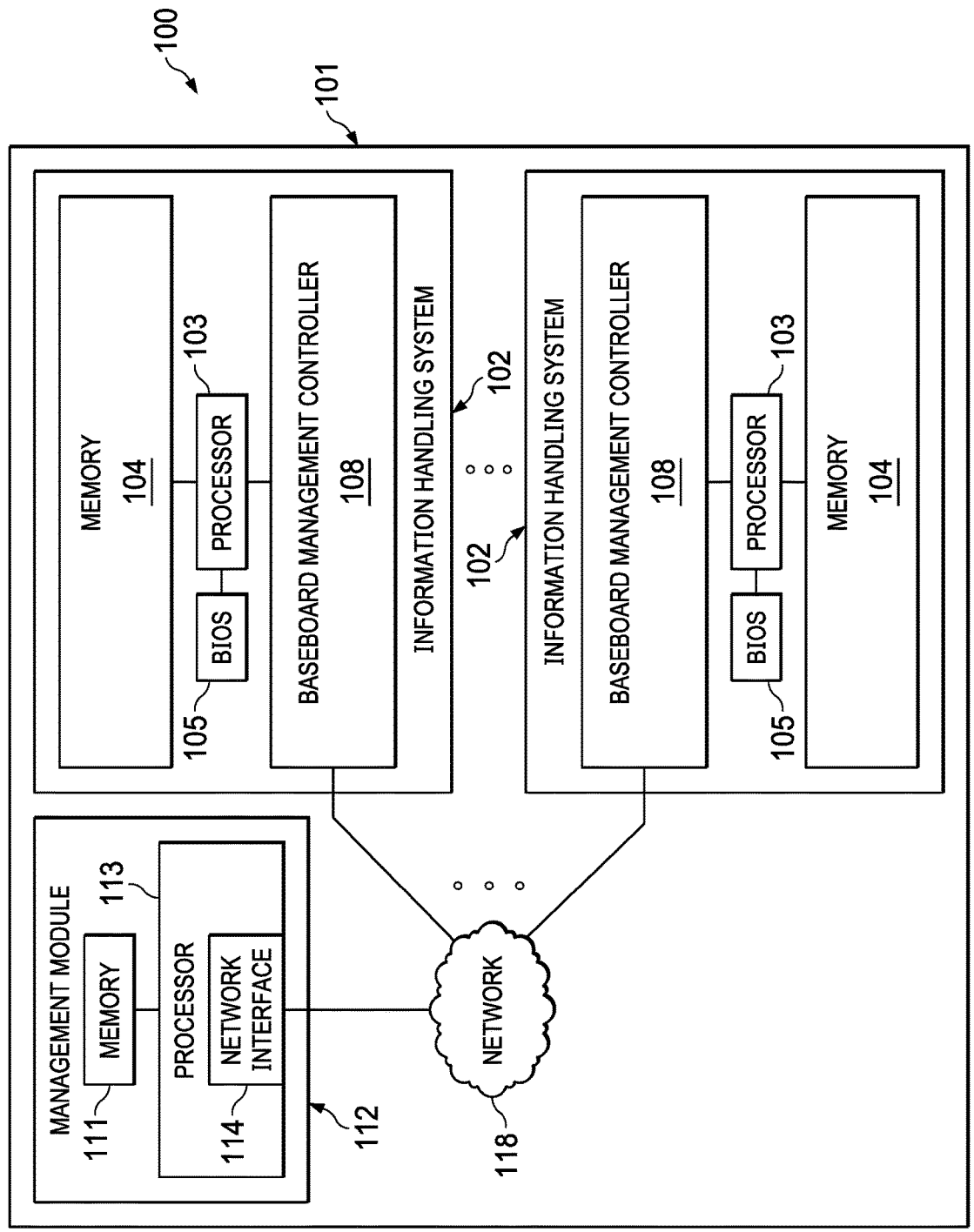
FIG. 1 illustrates a block diagram of an example system, in accordance with embodiments of the present disclosure.
Figure 2:
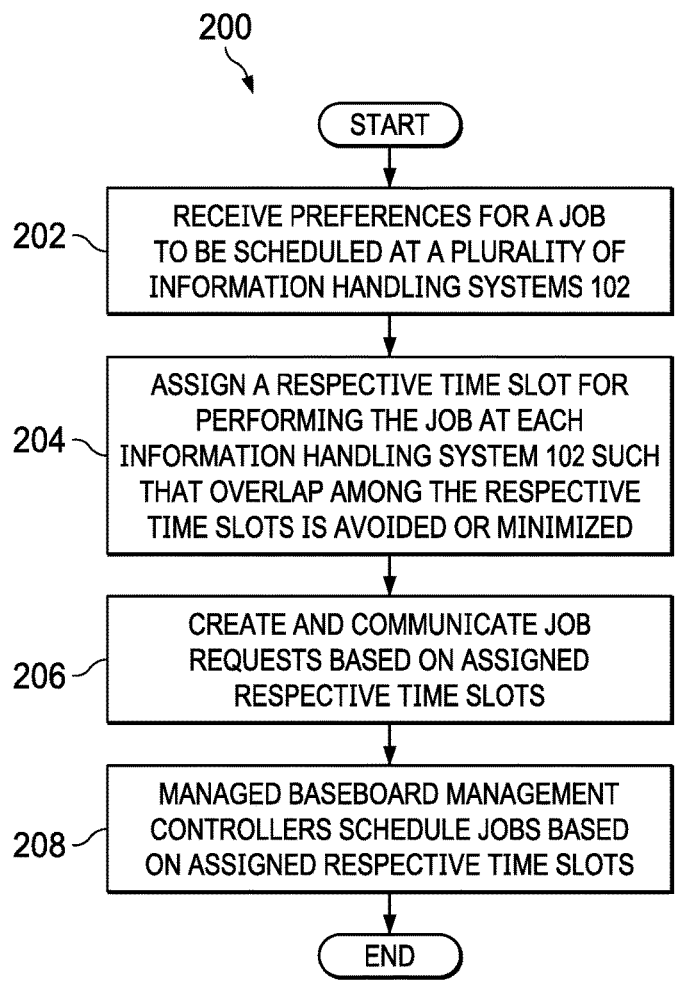
FIG. 2 illustrates a flow chart of an example method for enabling, at the level of a management module, asynchronous job scheduling among a plurality of information handling systems, in accordance with embodiments of the present disclosure.
Figure 3:
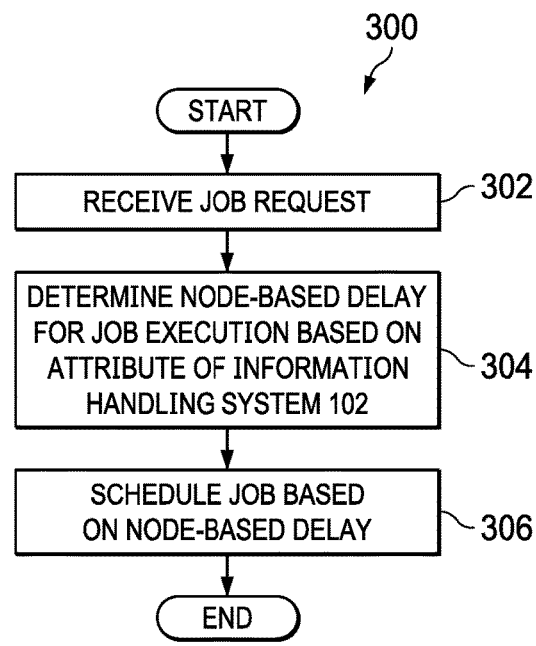
FIG. 3 illustrates a flow chart of an example method for enabling, at the level of a baseboard management controller, asynchronous job scheduling among a plurality of information handling systems, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100, in accordance with embodiments of the present disclosure. As shown in FIG. 1, system 100 may comprise a chassis 101 for enclosing a plurality of information handling resources, including a plurality of modular information handling systems 102 (e.g., sleds), a management module 112, and an internal network 118.

Chassis 101 may include any suitable enclosure for housing the various components of system 100, and may also be referred to as a rack, tower, enclosure, and/or housing.

As shown in FIG. 1, an information handling system 102 may include a processor 103, a memory 104 communicatively coupled to processor 103, a basic input/output system (BIOS) 105 communicatively coupled to processor 103, and a baseboard management controller 108 communicatively coupled to processor 103.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in an associated memory 104 and/or another component of its associated information handling system 102.

A memory 104 may be communicatively coupled to an associated processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

A BIOS 105 may be communicatively coupled to an associated processor 103 and may include any system, device, or apparatus configured to identify, test, and/or initialize information handling resources of an associated information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, a BIOS 105 may comprise boot firmware configured to be the first code executed by processor 103 when information handling system 102 is booted and/or powered on. As part of its initialization functionality, BIOS 105 code may be configured to set components of information handling system 102 into a known state, so that one or more applications (e.g., an operating system or other application programs) stored on compatible media (e.g., memory 104) may be executed by processor 103 and given control of information handling system 102.

A baseboard management controller 108 may be configured to provide out-of-band management facilities for management of information handling system 102. Such management may be made by baseboard management controller 108 even if information handling system 102 is powered off or powered to a standby state. In certain embodiments, baseboard management controller 108 may include or may be an integral part of a remote access controller (e.g., a Dell Remote Access Controller or Integrated Dell Remote Access Controller).

Although, for the purposes of clarity and exposition, FIG. 1 depicts only two information handling systems 102 within system 100, it is understood that system 100 may comprise any suitable number of information handling systems 102.

In addition to a processor 103, a memory 104, BIOS 105, and a baseboard management controller 108, an information handling system 102 may include one or more other information handling resources. For example, in some embodiments, an information handling system 102 may include more than one memory 104. As another example, in some embodiments, an information handling system 102 may include a programmable logic device (e.g., integral to or separate from baseboard management controller 108).

Management module 112 may be configured to provide out-of-band management facilities for management of shared chassis infrastructure of system 100, such as air movers, power supply units, and/or other components shared by a plurality of information handling systems 102. Management module 112 may also be configured to perform management of individual information handling systems 102 of chassis 101. Such management may be made by management module 112 even if system 100 is powered off or powered to a standby state. Management module 112 may include a processor 113 and one or more memories 111. In certain embodiments, management module 112 may include or may be an integral part of an enclosure controller (EC). In other embodiments, management module 112 may include or may be an integral part of a chassis management controller (CMC). In some embodiments, management module 112 may also be referred to as a "chassis manager." In yet other embodiments, management module 112 may include or may be an integral part of a group manager configured to management multiple information handling systems 102 spread across multiple chassis 101.

In some embodiments, management module 112 may execute a system management console that provides a graphical user interface or another interface allowing an administrator (e.g., either locally to chassis 101 or via another network interface of management module 112 not explicitly depicted in FIG. 1) to manage chassis 101 and information handling systems 102, including issuing management commands for chassis 101 and information handling systems 102. For example, such management commands may include a command to perform a firmware update, root of trust scan, and/or other job on or at an information handling system 102.

Although, for the purposes of clarity and exposition, FIG. 1 depicts only one management module 112, it is understood that system 100 may comprise any suitable number of management modules 112. For example, in some embodiments, two management modules 112 may be arranged in a redundant configuration, in which, at a given moment, one management module 112 may be "active" in that it is actively functional and performing its functionality, while another management module 112 is in a "standby" mode and may become active in the event that the active management module 112 experiences a fault or failure that causes it to failover to the standby management module 112.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions (e.g., firmware) and/or process data stored in memory 111 and/or another component of system 100 or management module 112. In some embodiments, processor 113 may comprise an enclosure controller configured to execute firmware relating to functionality as an enclosure controller. As shown in FIG. 1, processor 113 may include a network interface 114 for communicating with an internal network 118 of system 100.

Memory 111 may be communicatively coupled to processor 113 and may include any system, device, or apparatus configured to retain program instructions and/or data for a period of time (e.g., computer-readable media). Memory 111 may include RAM, EEPROM, a PCMCIA card, flash memory, magnetic storage, opto-magnetic storage, or any suitable selection and/or array of volatile or non-volatile memory that retains data after power to management module 112 is turned off.

Internal network 118 may comprise any suitable system, apparatus, or device operable to serve as communication infrastructure for network interface 114 to communicate to one or more other components, such as baseboard management controllers 108 of information handling systems 102. In some embodiments, internal network 118 may implement an Internet Protocol Management Bus (IPMB).

In addition to information handling systems 102, management module 112, and internal network 118, system 100 may include one or more other information handling resources. As an example, in some embodiments, an information handling system 102 may include a programmable logic device (e.g., integral to or separate from management module 112).

In operation, as described in greater detail below, management module 112 and baseboard management controllers 108 may enable an administrator to deploy features, firmware updates, and/or other jobs that cause non-ideal states in an asynchronous manner to multiple information handling systems 102 in a datacenter environment or across multiple information handling systems 102 in chassis 101. Such asynchronous scheduling functionality may comprise two main components: (a) integration of an intelligent scheduling feature into existing management interfaces (e.g., Dell OpenManage Enterprise, Multiple-Systems Management server, etc.) for management module 112, which may stagger jobs for managed information handling systems 102; and (b) addition of an optimized node-based delay into the existing functionality of baseboard management controllers 108, wherein such node-based delay is based on platform characterization. In addition, these two components may operate together to provide an effective mechanism to minimize or eliminate managed information handling systems 102 from concurrently experiencing non-ideal states due to features, firmware updates, and/or other jobs, and the node-based delay mechanism may provide a minimum layer of asynchronous protection for unmanaged information handling systems 102.

To further illustrate, management module 112 may enable automation of scheduling for staggered feature or firmware update jobs across multiple information handling systems 102 in chassis 101 and/or a datacenter environment. Accordingly, existing system management consoles may be provisioned with an option to schedule staggered jobs across all managed servers. Thus, automated scheduling may be initiated from a graphical user interface or a command-line interface of an existing system management console.

FIG. 2 illustrates a flow chart of an example method 200 for enabling, at the level of management module 112, asynchronous job scheduling among a plurality of information handling systems 102, in accordance with embodiments of the present disclosure. According to some embodiments, method 200 may begin at step 202. As noted above, teachings of the present disclosure may be implemented in a variety of configurations of information handling systems 102. As such, the preferred initialization point for method 200 and the order of the steps comprising method 200 may depend on the implementation chosen.

At step 202, management module 112 may receive from an administrator via a system management console an administrator's preferences for a job to be scheduled at a plurality of information handling systems 102. For example, such preferences may include the type of job to be scheduled, a window of time for scheduling the job, scheduling behavior (e.g., serialized or random), identities of the information handling systems 102 at which the job is to be performed, and/or other preferences.

At step 204, based on the selected window of time for scheduling the job, the identities of the information handling systems 102 at which the job is to be performed, and the scheduling behavior, management module 112 may, for each such information handling system 102, assign a respective time slot for performing the job at such information handling system 102, in order that such respective time slot is within the selected window of time for scheduling the job and overlap among the respective time slots is avoided or minimized.

As mentioned above, assignment of respective time slots may be made based on an administrator-selected scheduling behavior. For example, a scheduling behavior may be selected to be either random or serialized. For a random scheduling behavior, management module 112 may randomly (e.g., via use of a random-number generator) assign each information handling system 102 scheduled to execute the job to a respective time slot for performing the job among a plurality of available time slots. To illustrate, if the selected window of time for scheduling the job comprises a window of time between 12:00 p.m. and 1:00 p.m., and a job may take up to five minutes to complete, then 12 possible time slots may exist, and management module 112 may randomly assign each information handling system 102 scheduled to execute the job to a respective time slot of such 12 available time slots.

In some instances, the number of information handling systems 102 scheduled to execute the job may be more than the number of available time slots, in which case, management module 112 may assign multiple information handling systems 102 to a single available time slot. On the other hand, there may be fewer information handling systems 102 scheduled to execute the job than available time slots, in which case some of the available time slots may be left unused. The random assignment algorithm executed by management module 112 may uniformly distribute execution of the job at individual information handling systems 102 across the selected window of time for scheduling the job, in order to minimize conflicts (e.g., the number of information handling systems 102 executing the same job within the same time slot). Random scheduling may be preferred over serialized scheduling when the selected window of time for scheduling the job is small compared to the number information handling systems 102 for which a job is to be scheduled (e.g., which may be the case in a data center environment).

For a serialized scheduling behavior, the selected window of time for scheduling the job may be divided into individual available time slots and serially allocated to information handling systems 102 for which the job is to be scheduled. In the serialized case, the selected window of time for scheduling the job must be large enough to accommodate the job for all information handling systems 102 for which the job is to be scheduled. Thus, the serialized behavior may be desired where the number of information handling systems 102 for which the job is to be scheduled is small in relation to the selected window of time for scheduling the job.

At step 206, management module 112 may create job requests for each information handling system 102 for which the job is to be scheduled. For example, in a chassis environment, management module 112 may create job schedules for each information handling system 102 for which the job is to be scheduled. As a specific example, in a Multiple-Systems Management (MSM) server, MSM may use an existing Web Services Management (WSMAN) or Redfish interface to create and communicate jobs for respective baseboard management controllers 108 for each information handling system 102 for which the job is to be scheduled.

As another example, within a group manager environment, a group master (serving in effect as management module 112) may create job schedules for each information handling system 102 for which the job is to be scheduled and communicate job creation requests to each such information handling system 102. As a specific example, a group manager may use an existing ZeroMQ implemented bus to communicate job details from a group master to respective member baseboard management controllers 108 for each information handling system 102 for which the job is to be scheduled.

In a large scale environment when managing hundreds or thousands of respective baseboard management controllers 108 (e.g., using Open Manage), management module 112 may create job schedules for each information handling system 102 for which the job is to be scheduled. As a specific example, OpenManage may use an existing WSMAN interface to create and communicate jobs for respective baseboard management controllers 108 for each information handling system 102 for which the job is to be scheduled.

At step 208, each managed baseboard management controller 108 may receive its job request and schedule the job in its respective queue. An existing job queue infrastructure for a baseboard management controller 108 may be used for internal job management. Upon receiving a job request, a managed baseboard management controller 108 may create and schedule the job based on the schedule details. The results of the job itself may be logged appropriately. After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using a baseboard management controller 108, and/or any other system operable to implement method 200. In certain embodiments, method 200 may be implemented partially or fully in software and/or firmware embodied in computer-readable media.

In addition to or in lieu of the ability of management module 112 to enable automation of scheduling for staggered feature or firmware update jobs across multiple information handling systems 102 in chassis 101 and/or a data-center environment, a baseboard management controller 108 may be configured to employ a node-based scheduling delay which may be based on an attribute of the baseboard management controller 108 and/or its respective information handling system 102. For example, a node-based delay may be calculated as a mathematical product of a fixed time delay (e.g., stored in a platform power budget table or other computer-readable media associated with a baseboard management controller 108) and the attribute. In some embodiments, such attribute may comprise a physical slot number of a slot of chassis 101 in which the respective information handling system 102 of the baseboard management controller 108 resides.

In situations in which a physical slot number is not available (e.g., in a monolithic server), a baseboard management controller 108 may define the attribute based on a random number, or an external console may either automatically (e.g., through a mechanism such as rack slot location detection) or using existing location information (e.g., aisle number, rack number, etc.) determine such attribute. Either approach may generate a unique or semi-unique number, such that the various individual time delays across various information handling systems 102 may fully or partially desynchronize execution of jobs. For example, if the attribute for a monolithic system is a random whole number between 1 and 10, then only ten percent of the monolithic nodes within a data center may start a job at a specific instance in time.

The fixed time delay stored in the platform power budget table or other computer-readable media may be an empirically characterized value that is optimized for each type of information handling system platform. Each information handling system 102 may identify how much time delay may be needed to effectively cause asynchronous job scheduling behavior. In some embodiments, a baseboard management controller 108 may maintain multiple fixed time delays that each correspond to an optimized delay value for a particular feature, firmware update, or other job (e.g., based on whether reboots are required for a job).

FIG. 3 illustrates a flow chart of an example method 300 for enabling, at the level of baseboard management controller 108, asynchronous job scheduling among a plurality of information handling systems 102, in accordance with embodiments of the present disclosure. According to some embodiments, method 300 may begin at step 302. As noted above, teachings of the present disclosure may be implemented in a variety of configurations of information handling systems 102. As such, the preferred initialization point for method 300 and the order of the steps comprising method 300 may depend on the implementation chosen.

At step 302, baseboard management controller 108 may receive a job request from management module 112, the job request including a requested time of execution. At step 304, baseboard management controller 108 may determine a node-based delay for job execution based on an attribute of the baseboard management controller 108 or its respective information handling system 102. For example, such node-based delay may comprise a fixed delay (as described above) multiplied by the attribute. As described above, the attribute may be a slot number or other unique or semi-unique attribute of the baseboard management controller 108 or its respective information handling system 102.

At step 306, baseboard management controller 108 may schedule the job based on the requested time of execution and the node-based delay.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using a baseboard management controller 108, and/or any other system operable to implement method 300. In certain embodiments, method 300 may be implemented partially or fully in software and/or firmware embodied in computer-readable media.

Using approaches similar to those described above, a similar attribute and shared delay-based retry mechanism may be implemented in a multi-node chassis if a specific feature, firmware update, or other job requires deterministic behavior to prevent one or more information handling systems 102 from concurrent execution. In such a scenario, a chassis semaphore feature between an information handling system 102 and the chassis 101 in which it resides may be implemented (e.g., via Dell Function Service, Redfish, field-programmable gate array bits, etc.). Such chassis semaphore feature may determine if one or more nodes are executing a specific asynchronous behavior. If the semaphore is set, an information handling system 102 may implement a retry timer equal to the mathematical product of a retry number, an attribute of the information handling system 102, and a fixed delay. Such approach utilizes the node-based delay feature described above, while adding determinism via a generic chassis semaphore feature. In this approach, a table-based delay may not be necessary, and instead the semaphore may be used to ensure desynchronization.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising, at a management module configured to manage a plurality of information handling system server nodes:
    obtaining administrator preferences for a job to be scheduled at each of the plurality of information handling system server nodes;
    based on the administrator preferences, assigning for each of the plurality of information handling system server nodes a respective time slot for performing the job at such information handling system server node, to reduce overlap among the respective time slots;
    creating for each of the plurality of information handling system server nodes a respective job request for performing the job at such information handling system server node, the job request including a scheduled time for execution of the job based on the respective time slot of such information handling system server node;
    scheduling, at each information handling system server nodes, the job request associated with such information handling system based on a combination of:
    the scheduled time for execution associated with such information handling system node; and
    a node-based delay for job execution, determined based on an attribute of such information handling system server node wherein a value of the attribute differs between at least two of the plurality of information handling system server nodes.

2. The method of claim 1, wherein the administrator preferences include one or more of a type of job to be scheduled, a window of time for scheduling the job, a scheduling behavior, and identities of the information handling system server nodes at which the job is to be performed.

3. The method of claim 2, wherein the administrator preferences include a window of time for scheduling the job, and assigning the respective time slots comprises assigning the respective time slots within the window of time.

4. The method of claim 1, wherein the administrator preferences include a scheduling behavior defining whether the respective time slots are assigned randomly or serially to the plurality of information handling system server nodes.

5. The method of claim 1, wherein the attribute is a slot number associated with such information handling system server node.

6. The method of claim 1, wherein the node-based delay is a mathematical product of a fixed delay and the attribute.

7. The method of claim 6, wherein the fixed delay is based on a type of job subject to the job request.

8. The method of claim 1, further comprising executing the job based on the scheduled time for execution and the node-based delay.

9. The method of claim 1, wherein the node-based delay is based on a mathematical product of the attribute and a semaphore that ensures only one of the plurality of information handling system server nodes executes the job at a time.

10. The method of claim 1, wherein the attribute is a random number.

11. An information handling system comprising:
    a central processing unit (CPU); and
    a computer readable memory including processor-executable instructions that, when executed by the CPU, cause a management module of the system, configured to manage a plurality of information handling system server nodes, to perform operations including:
        obtaining administrator preferences for a job to be scheduled at each of the plurality of information handling system server nodes;
        based on the administrator preferences, assigning for each of the plurality of information handling system server nodes a respective time slot for performing the job at such information handling system server node, to reduce overlap among the respective time slots;
        creating for each of the plurality of information handling system server nodes a respective job request for performing the job at such information handling system server node, the job request including a scheduled time for execution of the job based on the respective time slot of such information handling system server node;
        scheduling, at each information handling system server nodes, the job request associated with such information handling system based on a combination of:
        the scheduled time for execution associated with such information handling system node; and
        a node-based delay for job execution, determined based on an attribute of such information handling system server node wherein a value of the attribute differs between at least two of the plurality of information handling system server nodes.

12. The information handling system of claim 11, wherein the administrator preferences include one or more of a type of job to be scheduled, a window of time for scheduling the job, a scheduling behavior, and identities of the information handling system server nodes at which the job is to be performed.

13. The information handling system of claim 12, wherein the administrator preferences include a window of time for scheduling the job, and assigning the respective time slots comprises assigning the respective time slots within the window of time.

14. The information handling system of claim 11, wherein the administrator preferences include a scheduling behavior defining whether the respective time slots are assigned randomly or serially to the plurality of information handling system server nodes.

15. The information handling system of claim 11, wherein the attribute is a slot number associated with such information handling system server node.

16. The information handling system of claim 11, wherein the node-based delay is a mathematical product of a fixed delay and the attribute.

17. The information handling system of claim 16, wherein the fixed delay is based on a type of job subject to the job request.

18. The information handling system of claim 11, wherein the operations further include executing the job based on the scheduled time for execution and the node-based delay.

19. The information handling system of claim 11, wherein the node-based delay is based on a mathematical product of the attribute and a semaphore that ensures only one of the plurality of information handling system server nodes executes the job at a time.

20. The information handling system of claim 11, wherein the attribute is a random number.

* * * * *